United States Patent
Akiyama (10) Patent No.: US 7,849,769 B2
(45) Date of Patent: *Dec. 14, 2010

(54) PRECISION ROLL TURNING LATHE

(75) Inventor: Takanobu Akiyama, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/762,511

(22) Filed: Jun. 13, 2007

(65) Prior Publication Data

US 2007/0295175 A1  Dec. 27, 2007

(30) Foreign Application Priority Data

Jun. 14, 2006  (JP) .............................. 2006-165144

(51) Int. Cl.
*B23B 3/18* (2006.01)
*B23B 29/24* (2006.01)
*B23B 29/04* (2006.01)

(52) U.S. Cl. ............................. 82/121; 82/159; 82/129; 82/117

(58) Field of Classification Search ................... 82/121, 82/123, 124, 131, 132, 137, 139, 153, 154, 82/159, 142, 148
See application file for complete search history.

(56) References Cited

U.S. PATENT DOCUMENTS

| | | | |
|---|---|---|---|
| 1,417,521 A * | 5/1922 | Haumann .................... 82/117 |
| 1,949,512 A | 3/1934 | Norton |
| 2,028,293 A * | 1/1936 | O'Brien et. al. ............. 409/327 |
| 2,222,206 A | 11/1940 | Stone et al. |
| 2,354,411 A * | 7/1944 | Thompson .................. 409/261 |
| 2,378,261 A | 6/1945 | Turney |
| 2,534,333 A | 12/1950 | Wyrick |
| 2,559,138 A * | 7/1951 | Waterson .................... 82/11.5 |
| 2,682,698 A | 7/1954 | Berthiez |
| 2,760,397 A * | 8/1956 | Arpin .......................... 82/132 |
| 3,017,697 A | 1/1962 | Wlodek |
| 3,125,931 A * | 3/1964 | Stanaback .................... 409/66 |
| 3,159,065 A * | 12/1964 | Diener ......................... 82/111 |
| 3,449,985 A | 6/1969 | Eaves et al. |

(Continued)

FOREIGN PATENT DOCUMENTS

CN  2541118  3/2003

(Continued)

OTHER PUBLICATIONS

Office Action issue in U.S. Appl. No. 11/762,524 mailed Sep. 18, 2008.

(Continued)

*Primary Examiner*—Boyer D Ashley
*Assistant Examiner*—Sara Addisu
(74) *Attorney, Agent, or Firm*—DLA Piper LLP US (57) ABSTRACT

The present invention provides a precision roll turning lathe which can form a pattern including three-dimensionally shaped portions, such as three-sided pyramids, on the surface of a roll, with high accuracy. Specifically, a tool post is provided with a tool turning axis (A axis) which is used to turn a tool such that, when forming a spiral groove cut through the roll, a cutting face of a tip of the tool is oriented perpendicular to a direction along which the spiral groove extends.

10 Claims, 8 Drawing Sheets

U.S. PATENT DOCUMENTS

| | | | |
|---|---|---|---|
| 3,703,112 A | | 11/1972 | Selby |
| 3,841,805 A | * | 10/1974 | Zalis .......................... 418/178 |
| 3,996,454 A | * | 12/1976 | Froyd ......................... 318/565 |
| 4,225,273 A | | 9/1980 | Womack |
| 4,266,276 A | * | 5/1981 | Hayashi et al. ............. 700/167 |
| 4,461,121 A | * | 7/1984 | Motzer et al. ................... 451/5 |
| 4,617,764 A | | 10/1986 | Reibakh |
| 4,766,788 A | * | 8/1988 | Yashiki et al. ................ 82/147 |
| 4,833,764 A | | 5/1989 | Muller |
| 4,840,095 A | * | 6/1989 | Nussbaumer et al. ......... 82/117 |
| 4,876,931 A | | 10/1989 | Bertini |
| 5,152,202 A | | 10/1992 | Strauss |
| 5,197,228 A | | 3/1993 | Sharky et al. |
| 5,222,283 A | | 6/1993 | Laschet |
| 5,289,622 A | | 3/1994 | Minagawa |
| 5,946,991 A | | 9/1999 | Hoopman |
| 5,964,016 A | | 10/1999 | Ito et al. |
| 6,040,653 A | | 3/2000 | O'Neill |
| 6,075,221 A | | 6/2000 | Minhas |
| 6,457,391 B1 | * | 10/2002 | Yamazaki et al. ............. 82/118 |
| 6,865,789 B2 | | 3/2005 | Katoh et al. |
| 6,868,304 B2 | * | 3/2005 | Uehara et al. ............... 700/159 |
| 6,945,147 B2 | * | 9/2005 | Sakashita ..................... 82/149 |
| 6,952,627 B2 | * | 10/2005 | Olczak et al. ............... 700/191 |
| 7,089,836 B2 | * | 8/2006 | Kato et al. .................... 82/1.11 |
| 7,240,412 B2 | * | 7/2007 | Sasazawa et al. ........... 29/27 C |
| 7,266,871 B2 | | 9/2007 | Takeuchi et al. |
| 2002/0008899 A1 | | 1/2002 | Tanaka et al. |
| 2002/0082742 A1 | * | 6/2002 | Kadono ....................... 700/160 |
| 2004/0003690 A1 | | 1/2004 | Katoh et al. |
| 2004/0045419 A1 | | 3/2004 | Bryan et al. |
| 2004/0050222 A1 | * | 3/2004 | Sakashita ..................... 82/148 |
| 2004/0187654 A1 | | 9/2004 | Kato et al. |
| 2007/0042160 A1 | | 2/2007 | Nakajima |
| 2007/0251360 A1 | * | 11/2007 | Akiyama .................... 82/53.1 |
| 2007/0295175 A1 | | 12/2007 | Akiyama |

FOREIGN PATENT DOCUMENTS

| | | | |
|---|---|---|---|
| CN | 1491765 | | 4/2004 |
| CN | 1736659 | | 2/2006 |
| DE | 2935829 A | * | 8/1980 |
| EP | 0403842 | | 12/1990 |
| JP | 59-024943 A | | 2/1984 |
| JP | 01-177924 A | | 7/1989 |
| JP | 04-283003 | | 10/1992 |
| JP | 2001-328002 | | 11/2001 |
| JP | 2005-537944 | | 11/2001 |
| JP | 2001328002 A | * | 11/2001 |
| JP | 2002-079401 | | 3/2002 |
| JP | 2002-160133 | | 6/2002 |
| JP | 2003-94239 | | 4/2003 |
| JP | 2004-223836 | | 8/2004 |
| JP | 2004-344916 | | 12/2004 |
| JP | 2004-358624 | | 12/2004 |
| JP | 2004345062 A | * | 12/2004 |
| JP | 2005-022058 | | 1/2005 |
| JP | 2006-130066 | | 5/2006 |
| JP | 2006-135560 | | 5/2006 |
| JP | 2006-156388 | | 6/2006 |
| JP | 2006-165144 | | 6/2006 |
| JP | 2006-166404 | | 6/2006 |
| KR | 0251794 | | 4/2000 |
| RU | 1815012 A1 | * | 5/1993 |
| RU | 1815012 A1 | * | 5/1993 |
| SU | 1227375 A | * | 4/1986 |
| SU | 1227375 A1 | * | 4/1986 |
| SU | 1227375 A1 | * | 4/1986 |
| SU | 1741981 A1 | * | 6/1992 |
| TW | M278500 | | 10/2005 |
| WO | WO 2004-024421 | | 3/2004 |

OTHER PUBLICATIONS

English Language machine translation of JP 2003 94239.
English Language machine translation of JP 2004 358624.
Office Action Issued in related Korean Application No. 10-2007-0040936, Mailed Mar. 27, 2008.
English language translation of Korean Office Action issued in Application No. 10-2007-0040936, mailed Mar. 27, 2008.
English language abstract of JP 2002-160133, published Jun. 4, 2002.
English language abstract of JP 2005-022058, published Jan. 27, 2005.
Machine English language translation of JP 2002-160133, published Jun. 4, 2002.
Machine English language translation of JP 2005-022058, published Jan. 27, 2005.
Office Action issued in U.S. Appl. No. 11/739,884 mailed Oct. 28, 2008.
Korean Offiice Action issued in Application No. 10-2007-0040936 mailed Dec. 12, 2008.
Translation of Korean Offiice Action issued in Application No. 10-2007-0040936 mailed Dec. 12, 2008.
Korean Offiice Action issued in Application No. 10-2007-0057853 mailed Dec. 12, 2008.
Translation of Korean Offiice Action issued in Application No. 10-2007-0057853 mailed Dec. 12, 2008.
English Language Abstract of JP 2001-328002.
English Language Abstract of JP 2002-079401.
Korean Offiice Action issued in Application No. 10-2007-0058393 mailed Dec. 12, 2008.
Translation of Korean Offiice Action issued in Application No. 10-2007-0058393 mailed Dec. 12, 2008.
English language machine translation of JP 2001-328002.
English language machine translation of JP 2002-079401.
English Language Abstract of JP 2003-94239.
English Language Abstract of JP 2004-358624.
Office Action issued in Korean Application 10-2007-0057853 dated Oct. 19, 2009.
English Translation of Office Action issued in Korean Application 10-2007-0057853 dated Oct. 19, 2009.
English Language Abstract of KR 0251794 issued Apr. 15, 2000.
Office Action issued in U.S. Appl. No. 11/762,524 mailed Apr. 16, 2009.
Chinese Office Action issued in Application No. 200710138844.2 mailed Feb. 27, 2009.
English Language Translation of Chinese Office Action issued in Application No. 200710138844.2 mailed Feb. 27, 2009.
English Language Abstract of CN 1736659.
Office Action issued in U.S. Appl. No. 11/739,884 mailed Apr. 30, 2009.
Chinese Office Action issued in Application No. 200710138845.7 mailed Mar. 6, 2009.
English Translation of Chinese Office Action issued in Application No. 200710138845.7 mailed Mar. 6, 2009.
English Language Translation of Office Action issued in TW Appl 096121380 dated Aug. 26, 2009.
Office Action issued in TW Appl 096121380 dated Aug. 26, 2009.
English Language Translation of Office Action issued in TW Appl 096121381 dated Aug. 26, 2009.
Office Action issued in TW Appl 096121381 dated Aug. 26, 2009.
English Language Abstract of JP 2004-345062.
English Language machine translation of JP 2004-345062.
English Language Abstract of JP 2004-344916 published Dec. 9, 2004.
Machine translation of JP 2004-344916 published Dec. 9, 2004.
English Language Translation of Chinese Office Action in CN Appl 2008-10090587.4 on Sep. 4, 2009.
Chinese Office Action in CN Appl 2008-10090587.4 on Sep. 4, 2009.
English Language Abstract of JP 2004-223836 published Aug. 12, 2004.

English Translation of Office Action issued in Korean Appl 10-2008-0031455 on Dec. 18, 2009.
Office Action issued in Korean Appl 10-2008-0031455 on Dec. 18, 2009.
English Abstract of JP Publication 04-283003 published Oct. 8, 1992.
English Abstract of JP Publication 2005-537944 published Dec. 15, 2005.
English machine translation of JP Publication 2005-537944 published Dec. 15, 2005.
English language abstract of JP 2004-358624, published Dec. 24, 2004.
Machine English language translation of JP 2004-358624, published Dec. 24, 2004
English language abstract of JP 2006-130066, published May 25, 2006.
Machine English language translation of JP 2006-130066, published May 25, 2006.
English language abstract of JP 2006-135560, published May 25, 2006.
Machine English language translation of JP 2006-135560, published May 25, 2006.
English language abstract of JP 2006-156388, published Jun. 15, 2006.
Machine English language translation of JP 2006-156388, published Jun. 15, 2006.
English language abstract of JP 2006-165144, published Jun. 22, 2006.
Machine English language translation of JP 2006-165144, published Jun. 22, 2006.
English language abstract of JP 2006-166404, published Jun. 22, 2006.
Machine English language translation of JP 2006-166404, published Jun. 22, 2006.
Image File Wrapper of U.S. Appl. No. 12/062,931 captured Jun. 14, 2010.
Image File Wrapper of U.S. Appl. No. 11/739,884 captured Jun. 14, 2010.
Image File Wrapper of U.S. Appl. No. 11/762,524 captured Jun. 14, 2010.
Image File Wrapper of U.S. Appl. No. 12/503,970 captured Jun. 14, 2010.
Image File Wrapper of U.S. Appl. No. 11/739,884 as of Jul. 12, 2010.
File History of U.S. Appl. No. 11/762,524 electronically captured only from Aug. 9, 2010 to Oct. 5, 2010.
Office Action issued in a corresponding Japanese Application No. 2006-123626 on Sep. 10, 2010.
English translation of the Office Action issued in corresponding Japanese Application No. 2006-123626 on Sep. 10, 2010.
English Language Abstract of JP 59-024943A, published Feb. 8, 1984.
English Language Abstract of JP 01-177924A, published Jul. 14, 1989.

* cited by examiner

PRECISION ROLL TURNING LATHE

BACKGROUND OF THE INVENTION

1. Field of the Invention

The present invention relates to a precision roll turning lathe which can machine a three-dimensional pattern, consisting of three-sided or four-sided pyramids arranged in a matrix, in the peripheral surface of a roll.

2. Background Art

Roll grinders and roll turning lathes are generally used as machine tools for machining rolls. A roll grinder includes a headstock, a tail stock, and a carriage which is provided with a grinding wheel.

Such a roll grinder can carry out grinding with a grinding wheel of the peripheral surface of a roll and, in addition, machining of grooves in the peripheral surface. Japanese Patent Laid-Open Publication No. 2003-94239 describes a roll grinder which is provided, in its carriage, with a groove-machining device having a cutting saw blade for groove cutting.

A roll turning lathe is a lathe in which a tool post, having e.g. diamond tools attached thereto, is mounted in a carriage, and is basically used for machining circumferential grooves on a roll by rotating the roll with a headstock and feeding the carriage in the lateral direction (X-axis direction) of the roll. When machining axial grooves on a roll, the carriage is moved at a high speed in the longitudinal direction (Z-axis direction) of the roll while indexing the roll with the headstock (C axis), thereby producing the axial grooves.

The recent progress of machine control technology has realized ultraprecision machining with a lathe, and it has become possible to machine even with a lathe a mold for molding an optical lens. For example, the applicant has proposed a vertical lathe capable of machining a mold for molding of a Fresnel lens (Japanese Patent Laid-Open Publication No. 2004-358624). The vertical lathe can machine with high precision V-shaped lens grooves of a mold for molding of a Fresnel lens.

Owing to the widespread use of liquid crystal displays, there is an increasing demand for lens sheets for use in a backlight of a liquid crystal panel. Such lens sheets include, besides the above-mentioned Fresnel lens, a lenticular lens sheet, a cross lenticular lens sheet, a prism sheet, etc.

Molding a lenticular lens sheet, a cross lenticular lens sheet or a prism sheet by extrusion molding using a transfer roll has recently been studied.

In the case of a transfer roll for the production of a lenticular lens sheet, it is only necessary to machine with precision circumferential grooves at a predetermined pitch in the peripheral surface of the roll. Such machining is possible even with a conventional common roll turning lathe.

On the other hand, in the case of a transfer roll for a cross lenticular lens sheet or a prism sheet, it is necessary to machine a three-dimensional pattern of four-side pyramids or three-sided pyramids on the roll.

For machining of a pattern of four-sided pyramids, cutting of circumferential grooves and axial grooves in a matrix pattern in the surface of a roll is being studied. As regards machining of a pattern of three-sided pyramids, a method is being studied which involves machining axial grooves in combination with spiral grooves in the peripheral surface of a roll. However, the conventional roll lathe has not successfully matched for such ultra-precise machining.

SUMMARY OF THE INVENTION

It is therefore an object of the present invention to solve the above problems in the prior art and provide a precision roll turning lathe which can machine with high precision a three-dimensional pattern of three-sided pyramids or four-sided pyramids in the surface of a roll.

In order to achieve the object above, the present invention features a precision roll lathe which comprises: a bed; a head stock, mounted on the bed, including a main spindle for providing rotation for a roll as a work while holding one end of the roll by means of a chuck, and having an indexing axis (C axis) adapted to index the roll in the circumferential direction; a tail stock which is located on the bed to be opposed to the head stock, and is adapted to rotatably support the other end of the roll; a carriage including a saddle mounted on the bed movably in the longitudinal direction (Z axis) of the roll, and a table mounted on the saddle movably in the direction (X axis) perpendicular to the longitudinal direction of the roll; and a tool swivel mounted on the table; a tool post mounted on the tool swivel and having a cutting tool attached thereto, wherein the tool post is provided with a tool turning axis (A axis) for turning the cutting tool such that, when machining a spiral groove on the circumferential surface of the roll, a cutting face of the cutting tool is oriented to be perpendicular to the direction along which the spiral groove extends.

According to the present invention, with a roll process employing a combination of a spiral groove and a longitudinal groove formed in a roll, a pattern including three-sided pyramids which are successively arranged in both the longitudinal and transverse directions can be formed on the surface of the roll. Furthermore, in the case of forming the three-sided pyramids, since a B axis of the tool post has a function for correcting and determining the position of the cutting face of the tool, in addition to an indexing function, a precisely machined face with the spiral groove can be obtained.

DETAILED DESCRIPTION OF THE PREFERRED EMBODIMENTS

Preferred embodiments of the present invention will now be described with reference to the drawings.

Figure 1:
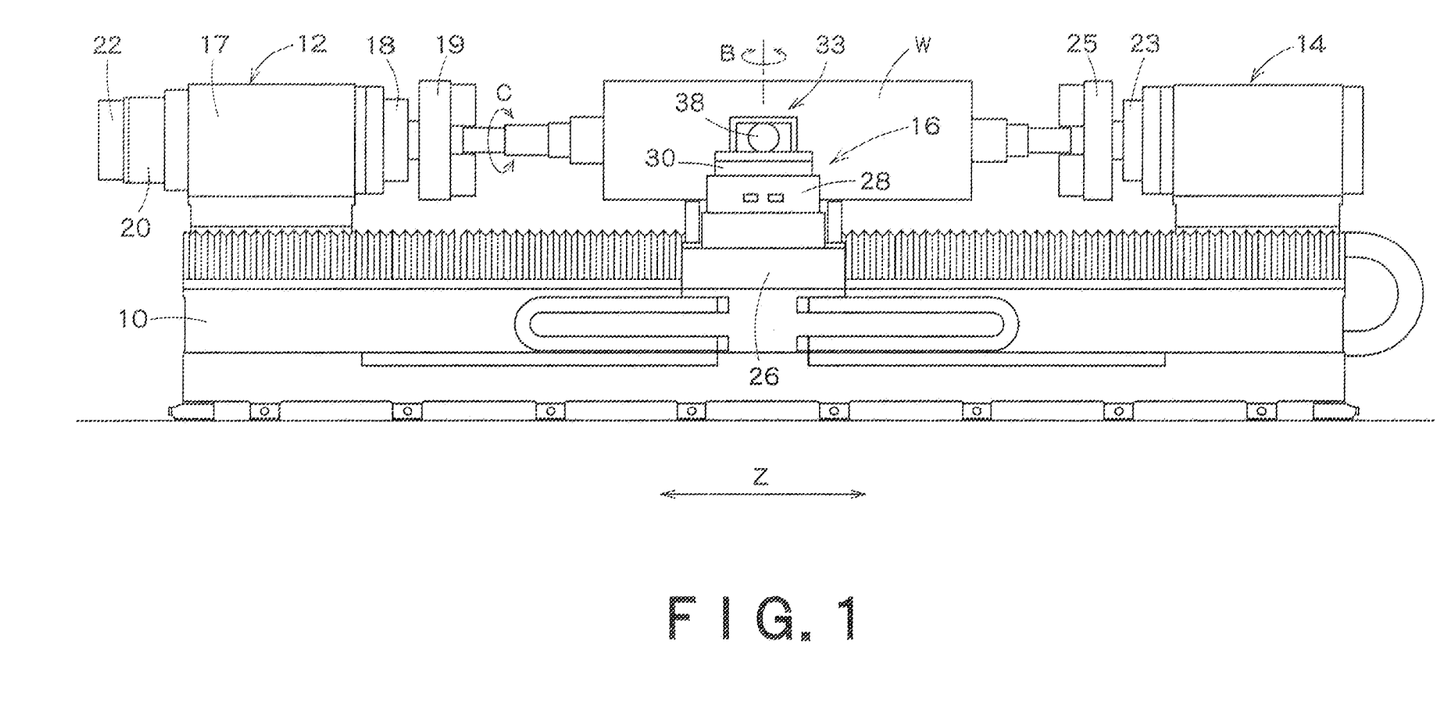
FIG. 1 is a side view showing a precision roll turning lathe according to one embodiment of the present invention.
Figure 2:
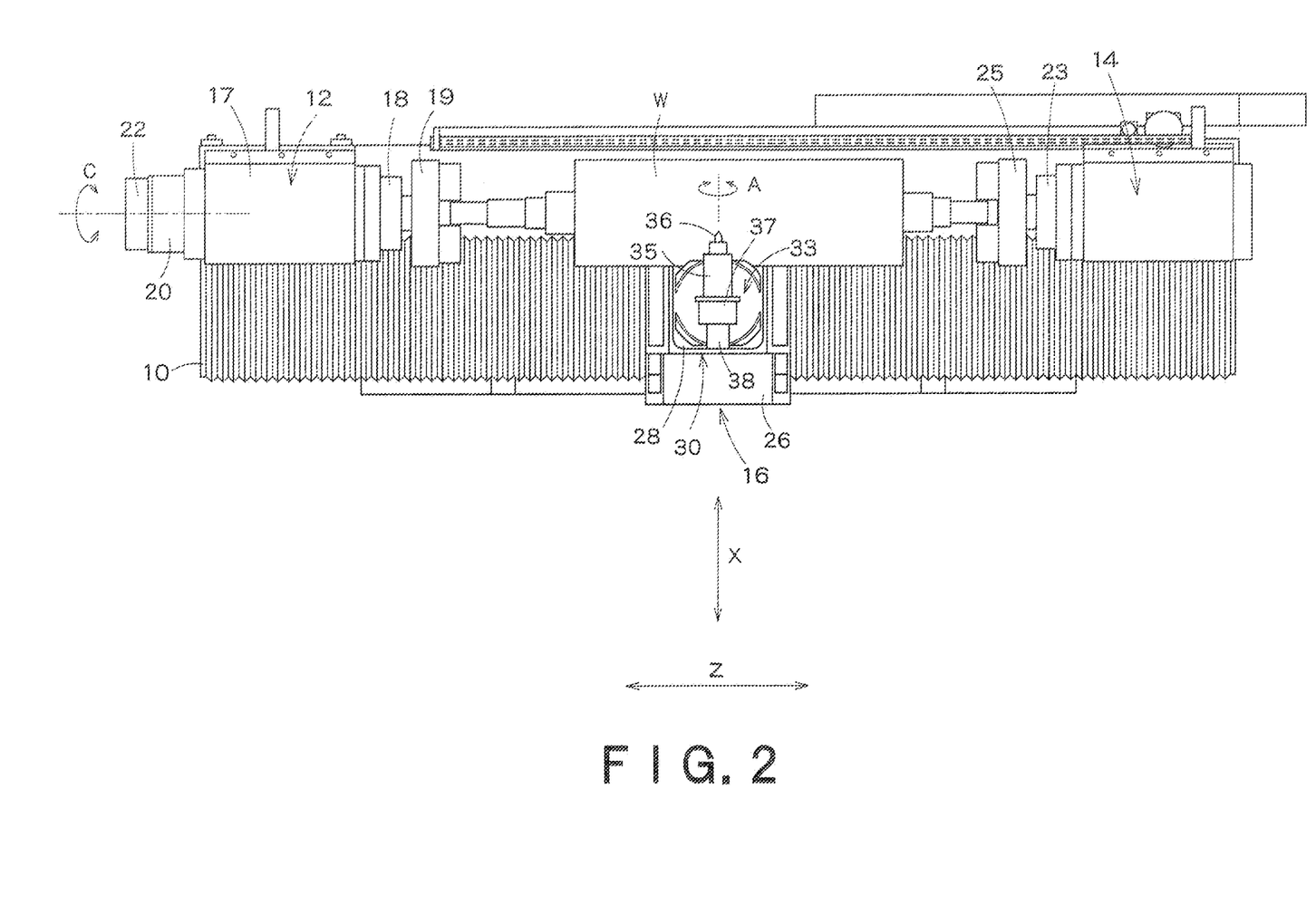
FIG. 2 is a plan view of the precision roll turning lathe in FIG. 1.

FIG. 1 is a side view of a precision roll turning lathe according to an embodiment of the present invention, and FIG. 2 is a plan view of the precision roll turning lathe.

In FIGS. 1 and 2, the reference numeral 10 denotes a bed. On the bed 10 are mounted a headstock 12, a tail stock 14 and a carriage 16. A workpiece W is rotatably supported by the headstock 12 and the tail stock 14. As illustrated in FIGS. 1 and 2, the workpiece W can have a substantially cylindrical shape, such as that of a roll, for example.

The headstock 12 is disposed on one longitudinal end of the bed 10. The headstock 12 includes a body 17, a main spindle 18, a chuck 19 secured to the front end of the main spindle 18, and a servo-motor 20 for driving the main spindle 18. The main spindle 18 is supported by a not-shown hydrostatic oil bearing provided within the body 17. The chuck 19 holds a spindle of the workpiece W and transmits the rotation of the main spindle 18 to the workpiece W.

In the head stock 12, the servo-motor 20 drives the main shaft 18 so as to rotate the workpiece W at a high speed. In addition to this function, the head stock 12 is provided with an additional function to serve as an indexing axis (C axis) adapted to index the workpiece W in the circumferential direction by detecting the amount of rotations of the servo-motor 20 by using an encoder 22 and controlling the rotations of the servo-motor 20. The bearing for the head stock 12 may be a pneumatic bearing or a mechanical bearing, rather than the hydrostatic pressure bearing.

Next, the tail stock 14 is disposed on the bed 10 and opposite to the headstock 12. A not-shown guide surface is provided on the upper surface of the bed 10 so that the tail stock 14 can be moved along the guide surface. The tail stock 14 has a main spindle 23 instead of a conventional common tail spindle, and rotatably supports a spindle of the workpiece W by means of a chuck 25 mounted to the main spindle 23. Such a tail stock 14 basically has the same construction as the headstock 12 except for having no servo-motor.

A description will now be given of the carriage 16.

The carriage 16 includes a saddle 26 mounted on the bed 10 movably in the axial direction of the workpiece W. On the saddle 26 is mounted a table 28 movably in a direction perpendicular to the axial direction of the workpiece W. In the precision roll turning lathe of this embodiment, the axis along which the saddle 26 is fed is termed Z axis, and the axis along which the table 28 is fed on the saddle 26 is termed X axis.

Figure 3:
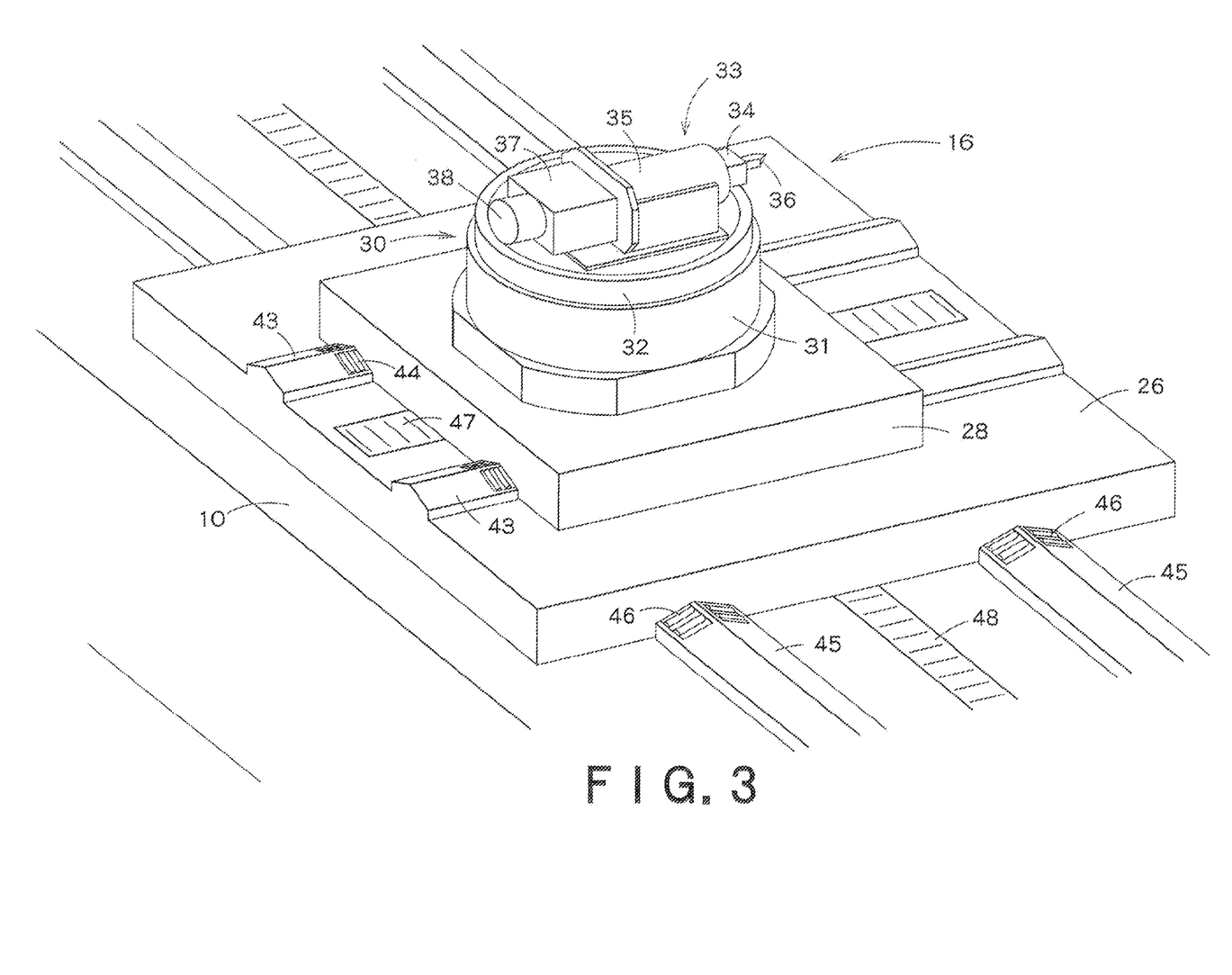
FIG. 3 is a perspective view a tool swivel provided in the precision roll lathe in FIG. 1.
Figure 4:
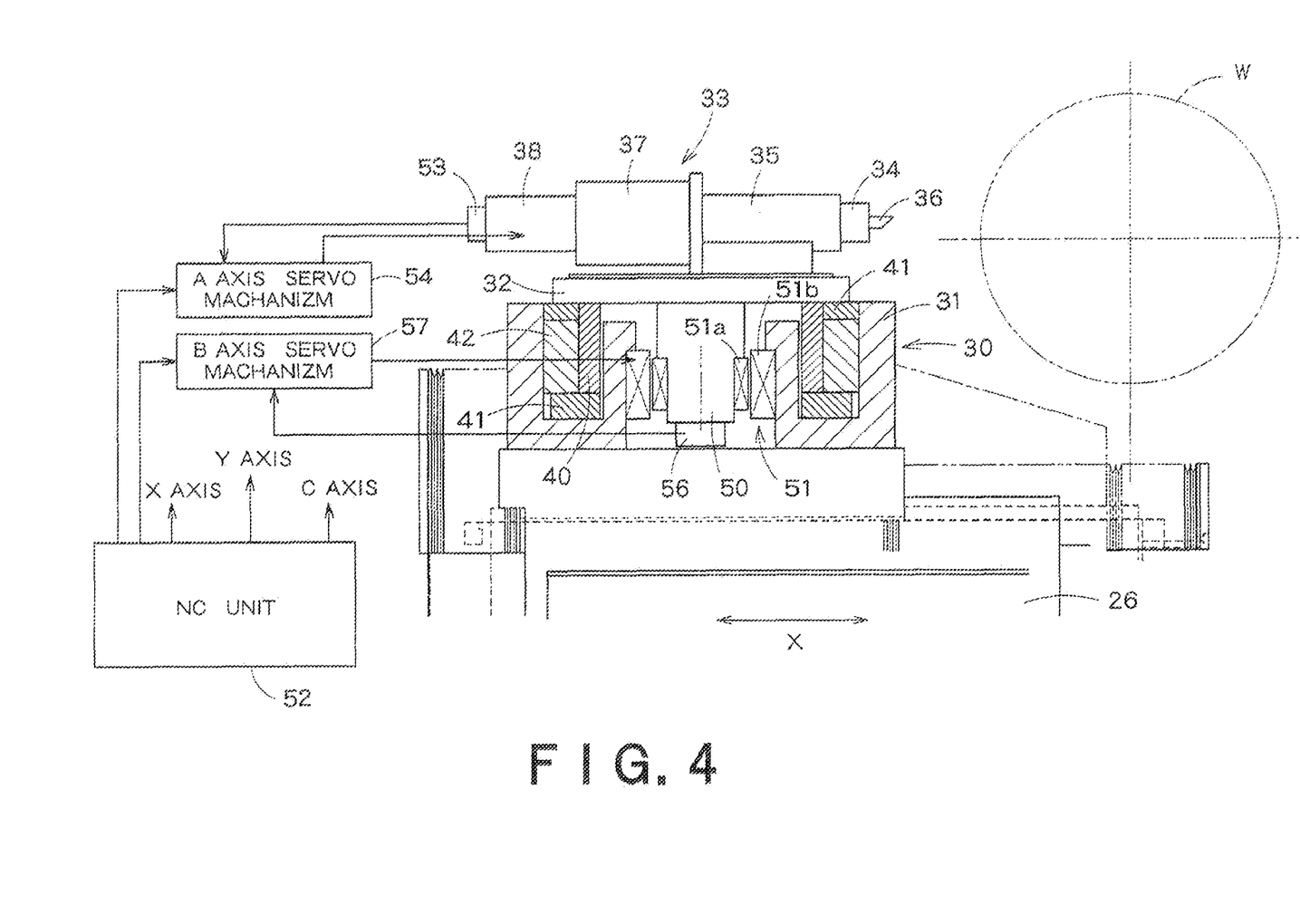
FIG. 4 is a partly cross-sectioned front view of the tool swivel of the precision roll lathe in FIG. 1.

FIG. 3 shows a tool swivel 30 with covers being removed from the bed 10 and saddle 26. FIG. 4 shows a cross section of the tool swivel 30. The tool swivel 30 according to this embodiment includes a swivel body 31.

On a top board 32 of the tool swivel 30, a tool post 33 is detachably mounted. The tool post 33 has an integral structure which is formed, with a tool holder 34, a bearing 35, a reduction gear 37 and a servo-motor 38, into a unit. The tool post 33 can be optionally attached to or removed from the top board 32.

In the tool holder 34, a diamond tool 36 as a cutting tool is held. The shaft of the tool holder 34 is rotatably supported by the bearing 35. The output shaft of the reduction gear 37 is connected with the bearing 35, while the servo-motor 38 is connected with the input shaft. Accordingly, the rotation of the servo-motor 38 is transmitted to the tool holder 34 after being decelerated by the reduction gear 37. As will be described below, with a control due to of the servo-motor 38, the A axis is defined as an axis around which the diamond tool 36 is turned.

In FIG. 4, the main spindle 40 is rotatably supported by a thrust bushing 41 and radial bushing 42 within the swivel body 31. In this embodiment gaps of about 15 μm are formed between the thrust bush bushing 41 and the lower end surface of the main spindle 40 and between the radial bushing 42 and a peripheral surface of the main spindle 40. The thrust bushing 41 and the radial bushing 42 support a radial load and a thrust load of the main spindle 40, respectively, by means of a pressurized air as shown by the arrows, thus constituting a pneumatic static air bearing. Alternatively, a hydrostatic oil bearing may be used, rather than utilizing such a pneumatic static air bearing. The top plate 32 is connected with the main shafts 40.

A drive shaft 50 is attached coaxially to the top board 32. A built-in type servo-motor 51 is incorporated in the swivel body 31 together with a stator 51b, with a rotor 51a of the servo-motor 51 being fixed to the drive shaft 50. In this manner, the B axis is defined to index the diamond tool 36 on the tool post 33 to rotate the drive shaft 50 driven by the servo-motor 51 and turning the tool post 33 together with the top board 32.

Referring to FIG. 3, a pair of X-axis guide rails 43, each having an inverter V-shaped guide surface, extends on the upper surface of the saddle 26. Each X-axis guide rail 43 has finite roller bearings 44 comprised of a large number of rollers held by a retainer. Similarly, a pair of Z-axis guide rails 45, each having an inverted V-shaped guide surface, extends on the upper surface of the bed 10. Each X-axis guide rail 46 likewise has finite roller bearings 43.

A Z-axis feed drive device for feeding the saddle 26 and an X-axis feed drive device for feeding the table 28 on which the tool swivel 30 is mounted are each comprised of a linear motor. In FIG. 3, reference numeral 47 denotes permanent magnet series which constitute the linear motor of the X-axis feed mechanism, and 48 denotes permanent magnet series that extend parallel to the Z-axis guide rails 42.

In FIG. 4, reference numeral 52 designates an NC unit. The NC unit 52 performs numerical control for the X axis, Z axis, A axis, B axis and C axis. In the case of the A axis, a position control loop is implemented with the A-axial servo-mechanism 54 and an encoder 53 for detecting the rotation angle of the diamond tool 36. The position control loop compares an instruction from the NC machine 52 with a positional feedback from the encoder 53. The servo-motor 38 then controls the cutting face of the diamond tool 36 to take an instructed angle. Also, in the case of the B axis, a position control loop is implemented with a B-axial servo-mechanism 57 and an encoder 56 so as to define the B axis to render the main shaft 40 an indexing function.

Next, a rolling process using the precision roll turning lathe constructed as described above will be described.

Figure 5:
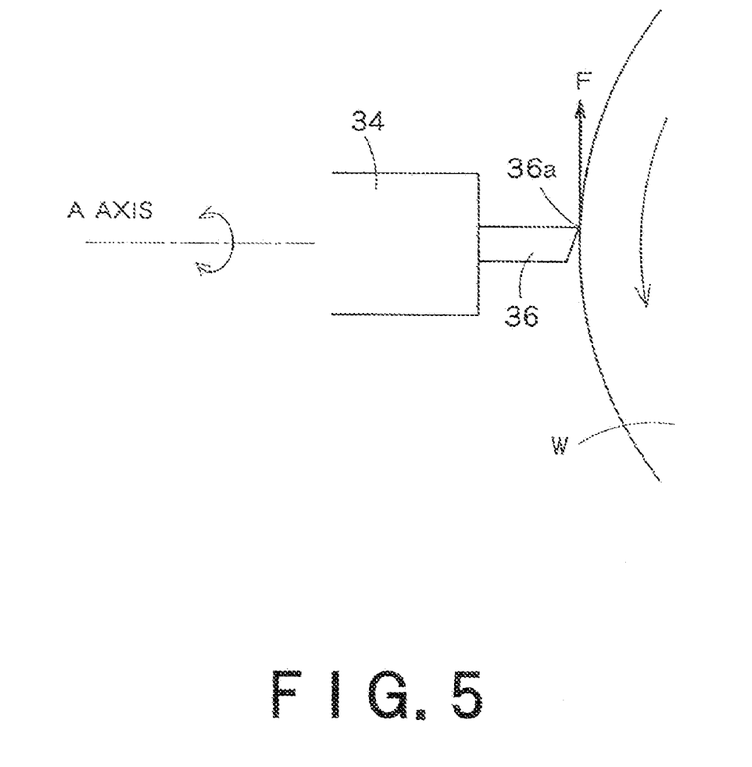
FIG. 5 is a diagram illustrating a cutting tool upon forming a groove in the circumferential direction in a roll.
Figure 6A:
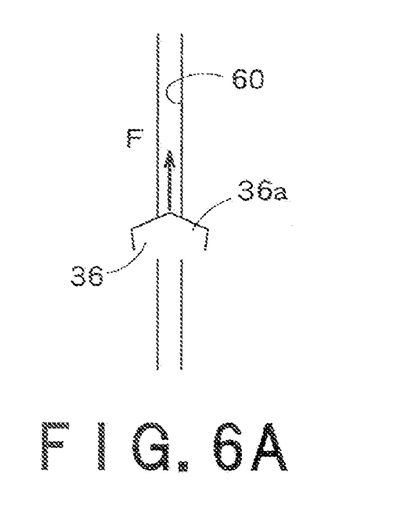
FIGS. 6A, 6B are diagrams provided for explaining the effects of turning a tool by an A axis.

FIG. 5 illustrates a position of a tool tip of the diamond tool 36 when forming a groove on the surface of the workpiece W, and FIG. 6(a) is a diagram that illustrates a relative positional relationship between a circumferential groove 60 that is made by the diamond tool 36 and the tool tip of the diamond tool 36.

As shown in FIG. 6(a), in the case of cutting the groove 60 in the circumferential direction, the cutting face 36a of the diamond tool 36 is perpendicular to the groove direction F. In the conventional roll turning lathe, the relationship between the tool cutting face and the groove is usually fixed as described above upon indexing the tool.

However, when the direction of the cutting face of the diamond tool 36 is fixed or set as described above with respect to FIG. 6(a), it is difficult to precisely cut or machine the workpiece W to form a spiral groove therein while rotating the workpiece W and feeding the tool 36 it in the Z-axial direction.

Figure 6B:
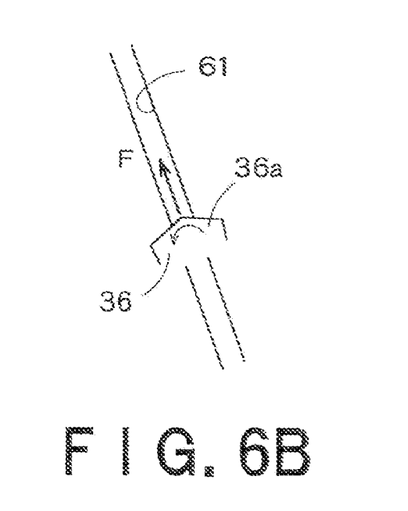

In the tool post 33 of this embodiment, however, since the A axis for indexing the direction of the cutting face of the diamond tool 36 is provided, as shown in FIG. 6(b), the cutting face 36a of the diamond tool 36 can be oriented to be perpendicular to the direction F of a spiral groove 61 by accurately turning the diamond tool 36 as instructed. Consequently, a precisely machined face of the spiral groove 61 can be obtained.

Figure 7:
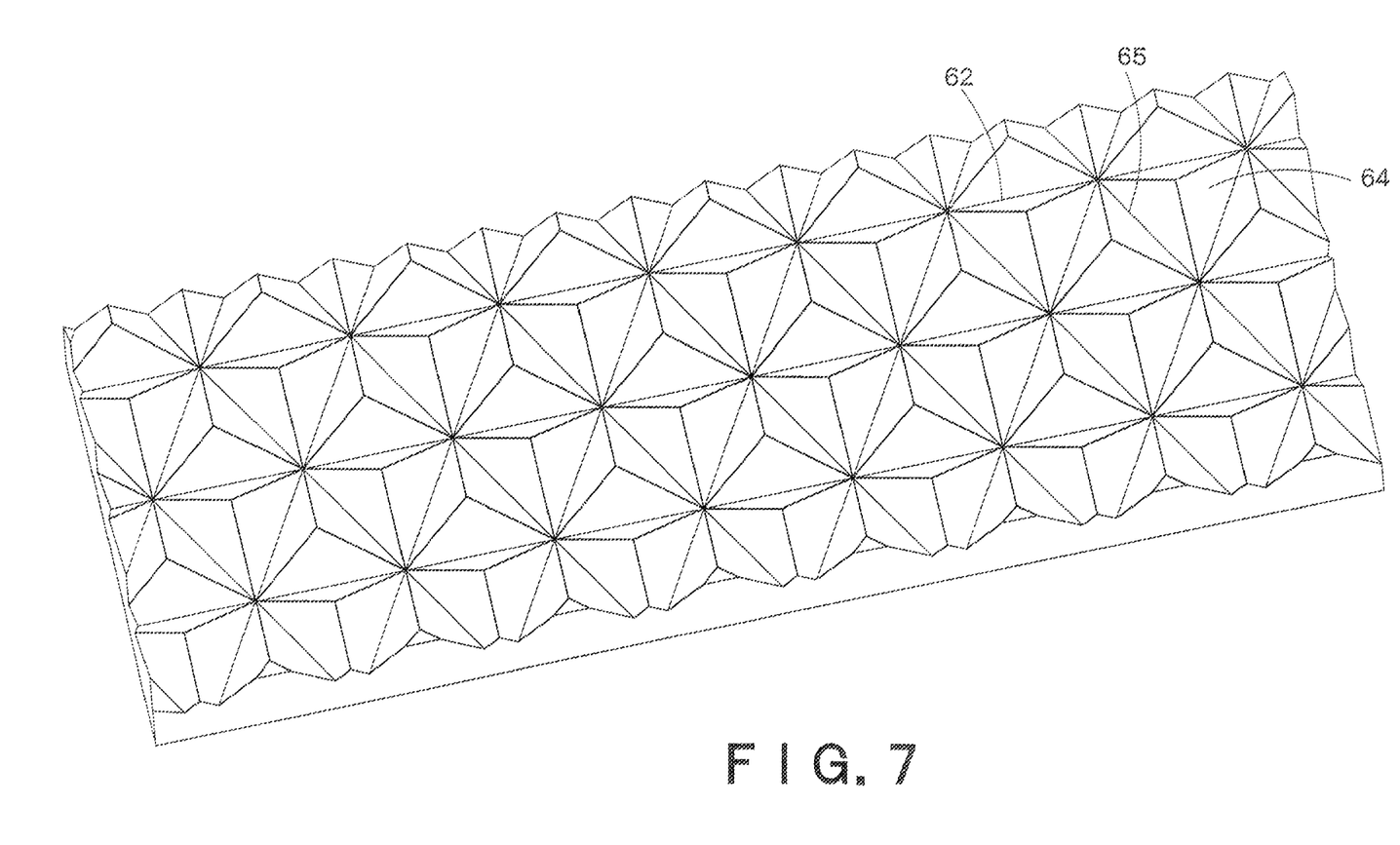
FIG. 7 is a diagram showing a concavo-convex pattern including three-sided pyramids formed by the precision roll turning lathe of the present invention.

FIG. 7 shows a three-dimensional pattern of three-sided pyramids arranged in a machined matrix. The three-dimensional pattern is machined on the surface of the roll by utilizing the A-axial function of the tool table 33 as described above. In this embodiment, by machining the roll surface with the three-sided pyramids, a transfer roller for a prism seat for use in extrusion molding can be formed. Such a pattern of three-sided pyramids can be basically produced by machining V-shaped longitudinal grooves 62 in combination with first V-shaped spiral grooves 64 and second V-shaped spiral grooves 65, spiraling in opposite directions. In this embodiment the first spiral grooves 64 and the second spiral grooves 65 have the same spiral angle.

Figure 8A:
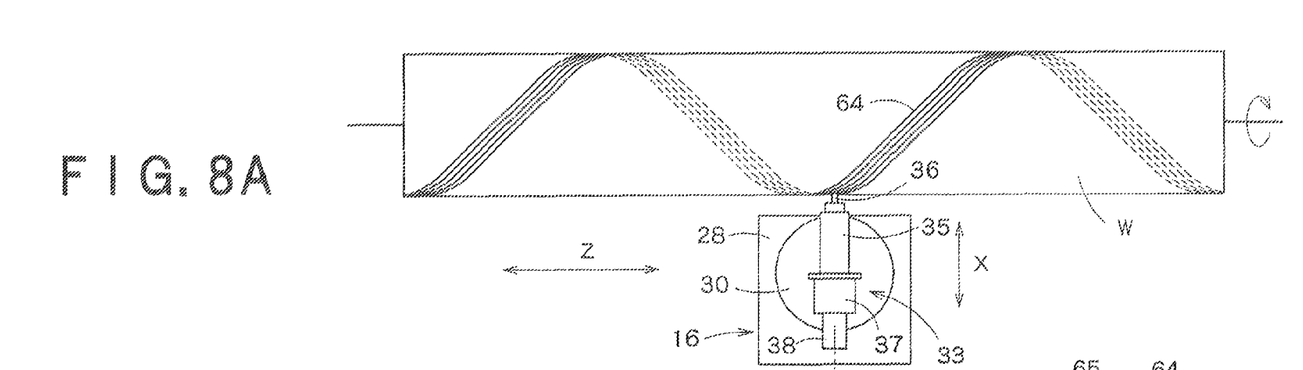
FIGS. 8A-8C are diagrams provided for explaining the order of processing the three-sided pyramids.

Machining of the first spiral grooves 64 will now be described. The first spiral grooves 64 can be machined with a diamond tool 36 while rotating the workpiece W in one direction A about the C-axis as shown in FIG. 8A and feeding the diamond tool 36 in the axial direction of the workpiece W. Namely, the cutting face of the diamond tool 36 of the tool table 33 is oriented to be perpendicular to the first spiral groove 64 by controlling the A-axis position of the cutting face, while the workpiece W is rotated by using the servomotor 20 of the head stock 12. The first spiral groove 64 is formed by having the workpiece W cut by the diamond tool 36 while the diamond tool 36 is being fed in the Z-axial direction on the carriage 16. Thereafter, by successively indexing the process starting position using the C-axial function, the first spiral groove 64 can be processed continuously and in the same manner as described above.

Figure 8B:
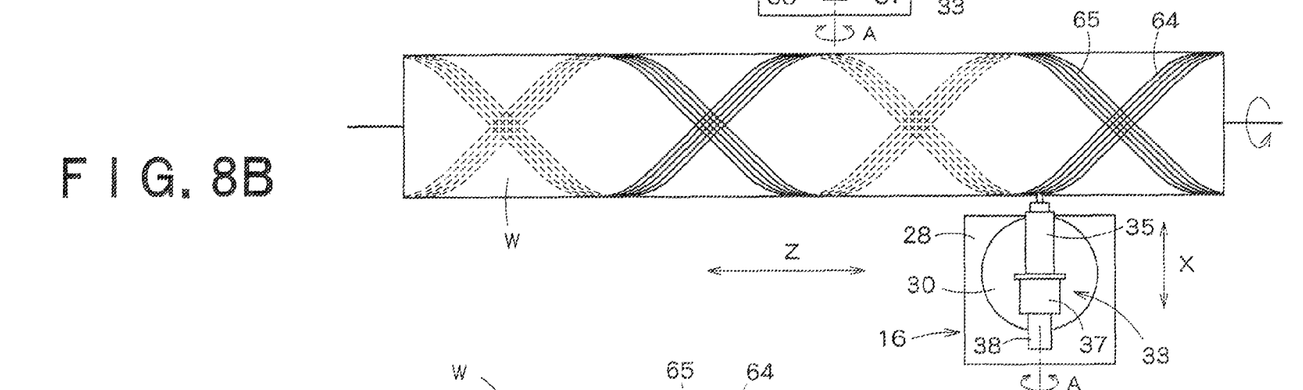

Next, the second spiral grooves 65, intersecting with and reversely spiraling to the first spiral grooves 64, can be machined by reversely rotating the workpiece W in the direction about the C-axis shown in FIG. 8B and, as with the first spiral grooves 64, feeding the headstock 12 in the Z-axis direction.

Figure 8C:
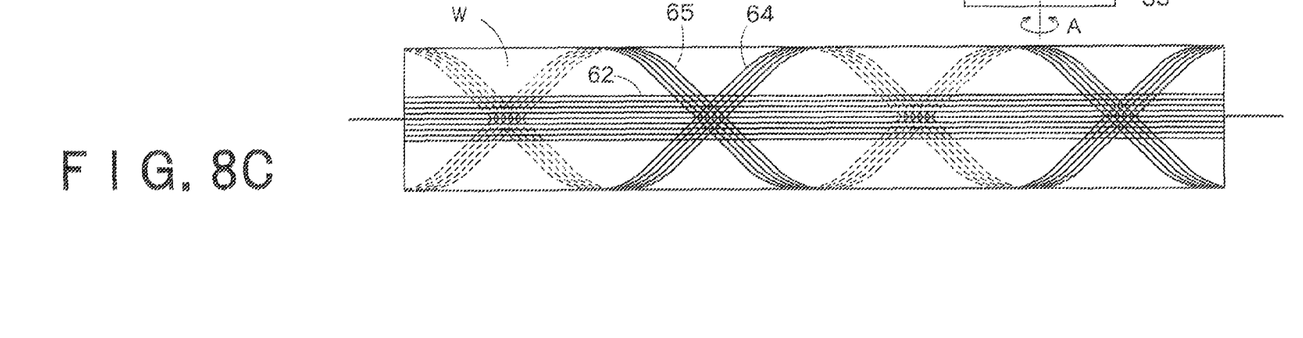
Figure 9:
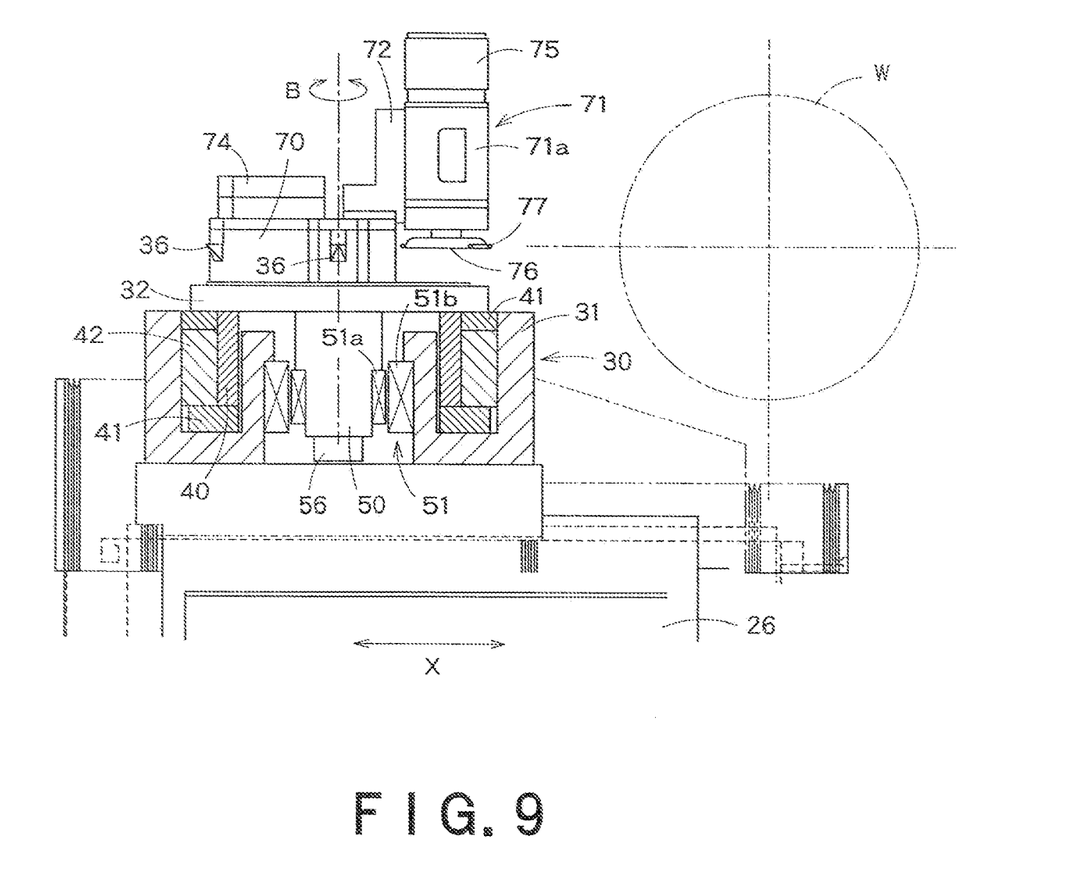
FIG. 9 is a partly cross-sectioned front view of the tool post which is exchanged for forming a groove in the axial direction in the roll.

After machining the first spiral grooves 64 and the second spiral grooves 65 successively as described above, the longitudinal groove 62 is machined as shown in FIG. 8C. The process for the longitudinal groove 62 is carried out by exchanging the tool post 33 used to form the spiral grooves with another tool post 70 provided with a fly cutter spindle device 71 as shown in FIG. 9. The tool post 70 is attached to the tool swivel 30 to cut or machine the longitudinal groove 62 on the workpiece W.

In FIG. 9, a tool post 70 is mounted on one side of the top board 32, and a fly cutter spindle device 71 is disposed at a position on the other side of the top board 32. The fly cutter spindle device 71 is supported by a bracket 72 secured to the tool post 70. The tool post 70 is a tool post generally in a half-column shape, having diamond tools 36 arranged circumferentially at predetermined intervals. In this embodiment three diamond tools 36 are provided in the tool post 70, and each tool 36 can be indexed by swiveling the tool post 33 by 60 degrees together with the top board 32. A counter weight 74 for balancing the weight of the tool post 33 with the weight of the fly cutter spindle device 34 is placed on the upper surface of the tool post 33.

The fly cutter spindle device 71 includes a body 71a, a servo motor 75, and a cutter holder 76 having a fly cutter 77 attached thereto. A not-shown cutter spindle is supported by an air bearing in the interior of the body 71a. The cutter spindle is directly driven by the servo motor 75 and rotates at a high speed. The cutter holder 76, which is mounted to the front end of the cutter spindle, is disk-shaped so as to increase the circumferential speed. The fly cutter 77, comprised of a diamond tool, is held on the peripheral surface of the cutter holder 76. In this embodiment the cutter spindle device 71 supports the cutter spindle in a vertical position with respect to the X-axis direction and to the Z-axis direction, and rotates the fly cutter 77 at a high speed in the X-Z plane. The cutting edges of the diamond tools 36, mounted in the tool post 33, lie in the same X-Z plane in which the fly cutter 77 rotates.

Since the fly cutter spindle device 71 is installed at the tool post 70 as described above, the longitudinal groove 62 can be formed in the following manner.

Namely, the fly cutter spindle device 71 is first indexed by using the B-axial function, and the circumferential position of the longitudinal groove 62 to be machined on the workpiece W is then indexed by using the C-axial function.

To produce the longitudinal groove 62, the fly cutter spindle device 71 is driven and rotated at a high speed, while the fly cutter 77 is cuts the workpiece W in the X-axial direction. The longitudinal groove 62 can be formed by cutting the workpiece W using the fly cutter 77, while the carriage 16 is fed in the Z-axial directional. Since this process can be performed while providing an optimum cutting speed (approximately 300 m/minute) to the fly cutter 77, the longitudinal groove 62 can be formed with high accuracy. Thereafter, other longitudinal grooves 62 are formed at a constant pitch in succession such that they pass through each crossing point of the spiral grooves 64 and 65, while the workpiece W is indexed at each cutting position by utilizing the C-axial function (see FIG. 8C).

As stated above, by utilizing the tool post 33 and the tool post 70 for different purposes, the three-sided pyramids pattern as shown in FIG. 7 can be formed in the roll surface by using a single roll lathe, as such even a product, such as a transfer roller for a prism sheet, which is used in extrusion molding, which requires ultra-precise machining, can be formed.

The invention claimed is:

1. A precision workpiece turning lathe comprising:
a bed;
a head stock, mounted on the bed, including a main spindle for providing rotation for a cylindrical workpiece while holding one end of the cylindrical workpiece by a chuck, the head stock having an indexing axis (C axis) adapted to index the rotation of the cylindrical workpiece in a circumferential direction of the cylindrical workpiece;
a tail stock located on the bed opposite to the head stock, the tail stock being adapted to rotatably support the other end of the cylindrical workpiece;
a carriage including a saddle mounted on the bed movably in a longitudinal direction (Z, axis) of the cylindrical workpiece, and a table movably mounted on the saddle in a direction (X axis) substantially perpendicular to the longitudinal direction of the cylindrical workpiece;
a tool swivel mounted on the table;
a tool post mounted on the tool swivel, the tool post having a turning lathe cutting tool attached thereto; and
a servomechanism configured to control a rotational position of the turning lathe cutting tool around a tool turning axis (A axis) along a longitudinal axis of the turning lathe cutting tool,
wherein when machining a spiral groove on a circumferential surface of the cylindrical workpiece, the servomechanism orients and holds a cutting face of the turning lathe cutting tool in a position substantially perpendicular to a direction along which the spiral groove extends.

2. The precision workpiece turning lathe according to claim 1, wherein the tool post includes:
a servo-motor as a driving source, the servo-motor being in communication with the servomechanism;
a tool holder adapted to hold the turning lathe cutting tool;
a bearing for rotatably supporting a shaft of the tool holder; and
a reduction means adapted to output a rotation of the servo-motor to the shaft of the tool holder.

3. The precision workpiece turning lathe according to claim 2, wherein the tool post is detachably mounted to the tool swivel and exchangeable with a tool post of another type.

4. The precision workpiece turning lathe according to claim 3, wherein the tool post of another type includes a plurality of turning lathe cutting tools and a fly cutter spindle device adapted to rotate a fly cutter.

5. The precision workpiece turning lathe according to claim 4, wherein the fly cutter spindle device includes a disk-shaped cutter holder configured to hold the turning lathe fly cutter on its peripheral surface, a body having in its interior an air bearing supporting the cutter spindle, and a servo-motor for directly driving the cutter spindle.

6. The precision workpiece turning lathe according to claim 4, wherein the tool swivel is adapted to turn the tool post around a tool post turning axis (B-axis) and index the plurality of turning lathe cutting tools or the fly cutter of the tool post.

7. The precision workpiece turning lathe according to claim 3, wherein the tool swivel is configured to rotate around a tool post turning axis (B axis) and index the turning lathe cutting tool or a fly cutter of the tool post.

8. The precision workpiece turning lathe according to claim 1, further comprising a rolling guide configured to guide the feed of the carriage, the rolling guide being configured to move along the longitudinal direction (Z-axis) of the roll, the rolling guide extending on the bed parallel to the Z axis and having a guide surface in which a large number of rollers are arranged.

9. The precision workpiece turning lathe according to claim 1, further comprising an X-axis feed drive device configured to move the table along the X-axis and a Z-axis feed drive device configured to move the carriage along the Z-axis, wherein each of the X-axis feed drive device and the Z-axis feed drive device comprises a linear motor.

10. The precision workpiece turning lathe according to claim 1, wherein the tool turning axis (A axis) is substantially perpendicular to the longitudinal direction (Z axis) of the cylindrical workpiece.

* * * * *